US 6,952,802 B2

(12) United States Patent
Hardy

(10) Patent No.: US 6,952,802 B2
(45) Date of Patent: Oct. 4, 2005

(54) USER CONTROLLABLE DOCUMENT CONVERTER AND METHODS THEREOF

(75) Inventor: Vincent J. Hardy, Menlo Park, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 866 days.

(21) Appl. No.: 09/833,500

(22) Filed: Apr. 11, 2001

(65) Prior Publication Data

US 2001/0039555 A1 Nov. 8, 2001

Related U.S. Application Data

(60) Provisional application No. 60/197,309, filed on Apr. 14, 2000, and provisional application No. 60/197,540, filed on Apr. 14, 2000.

(51) Int. Cl.[7] .............................................. G06F 17/00
(52) U.S. Cl. ..................... 715/526; 715/530; 715/514
(58) Field of Search ................................ 715/514, 517, 715/530, 526, 523; 345/419; 707/10, 101

(56) References Cited

U.S. PATENT DOCUMENTS

| | | | | |
|---|---|---|---|---|
| 5,355,472 A | * | 10/1994 | Lewis | 707/101 |
| 6,067,553 A | * | 5/2000 | Downs et al. | 715/523 |
| 6,615,212 B1 | * | 9/2003 | Dutta et al. | 707/10 |
| 6,725,424 B1 | * | 4/2004 | Schwerdtfeger et al. | 715/513 |
| 6,738,951 B1 | * | 5/2004 | Weiss et al. | 715/523 |
| 6,741,242 B1 | * | 5/2004 | Itoh et al. | 345/419 |

* cited by examiner

Primary Examiner—Joseph Feild
Assistant Examiner—Laurie Anne Ries
(74) Attorney, Agent, or Firm—Beyer Weaver & Thomas LLP

(57) ABSTRACT

A method, apparatus and computer program product for a non-atomic (i.e., user controllable) format converter that affords a user the ability to control the structure of the converted document as well as selectively add information to or otherwise modify selected portions of the converted document is described.

10 Claims, 7 Drawing Sheets

USER CONTROLLABLE DOCUMENT CONVERTER AND METHODS THEREOF

CROSS-REFERENCE TO RELATED APPLICATIONS

This application takes priority under 35 U.S.C. §119(e) of (i) Provisional U.S. Patent Application No. 60/197,309 filed Apr. 14, 2000 naming Vincent J. Hardy as inventor and (ii) Provisional U.S. Patent Application No. 60/197,540 filed Apr. 14, 2000 naming Vincent J. Hardy as inventor each of which is incorporated herein by reference for all purposes.

BACKGROUND OF THE INVENTION

1. Field of Invention

The invention relates generally to computer systems. More particularly, methods and apparatus for user controlled conversion of a document in a computer based system.

2. Description of Relevant Art

In the broadest sense, a document is a form of information that can put into an electronic form and stored in a computer as one or more files. Often a single document becomes a single file, whereas an entire document or individual parts may be treated as individual data items. Recent approaches for storing and manipulating computer stored documents utilize a tree structure to organize the various individual data items. One such approach is referred to as the Document Object Model (DOM). The Document Object Model is a programming API for Hypertext Markup Language (HTML) and Extensible Markup Language (XML) documents that defines the logical structure of documents and the way a document is accessed and manipulated. In the DOM specification, the term "document" is used in the broad sense-increasingly, XML is being used as a way of representing many different kinds of information that may be stored in diverse systems, and much of this would traditionally be seen as data rather than as documents. Nevertheless, XML presents this data as documents and the DOM may be used to manage this data. With the Document Object Model, programmers can create and build documents, navigate their structure, and add, modify, or delete elements and content such that anything found in an HTML or XML document can be accessed, changed, deleted, or added using the Document Object Model.

It may be necessary on occasion to convert a document from one format to another such as, for example, converting a spreadsheet based document into a text based document, or vice-versa. Unfortunately since most document formats are substantially different from one another, conventional conversion processes are generally "lossy" in that valuable information is lost in the conversion process or the documents are restructured in such a manner as to lose information. An example of such a lossy conversion is when a text based document having internal structure such as headers, footers, embedded figures, etc. is converted to a GIF (or any raster based document) which has no internal document structure since all headers, footers, embedded figures are "logically" the same. In this case, it would not be possible to "edit" any of the text in the converted document since that information referred to as "text" in the original document has been lost in the conversion process.

In addition to the lossy nature of conventional document converters, conventional converters are generally atomic in nature in that the conversion process is indivisible affording no opportunity for a user to affect the conversion process or the eventual structure or organization of the converted document.

Therefore, in view of the foregoing, it would be advantageous and therefore desirable to have a non-atomic document converter that affords a user the ability to control the structure in the converted document.

SUMMARY OF THE INVENTION

Broadly speaking, the invention relates to an improved method, apparatus and computer system for a non-atomic (i.e., user controllable) format converter that affords a user the ability to control the structure of the converted document as well as selectively add information to or otherwise modify selected portions of the converted document is described.

In one embodiment a user controllable non-atomic method of selectively converting a rendering sequence into a document is described. The rendering sequence is parsed into a set of associated sub-rendering sequences such that each of the set of sub-rendering sequences includes a basic rendering component. One of the set of associated sub-rendering sequences and a basic rendering component that is relevant to the user are selected. The selected one of the set of associated subrendering sequences is broken into a corresponding plurality of basic rendering components based upon the selected relevant rendering component. Each of the corresponding plurality of basic rendering components is converted to form a set of converted rendering components and the set of converted rendering components is then accessed. Selected ones of the set converted rendering components are tagged based upon a user supplied tagging instruction to form a subset of tagged converted rendering components. The set of converted rendering components and the subset of tagged converted rendering components are combined to form the document.

In another embodiment, a user controllable apparatus for selectively converting a rendering sequence into a document is described.

In yet another embodiment, a computer program product for selectively converting a rendering sequence into a document is described.

These and other advantages of the present invention will become apparent upon reading the following detailed descriptions and studying the various figures of the drawings.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE EMBODIMENTS

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

In general, the invention provides a method, apparatus and computer program product for a non-atomic (i.e., user controllable) format converter that affords a user the ability to control the structure of the converted document as well as selectively add information to or otherwise modify selected portions of the converted document is described. In one embodiment, for example, a user controllable non-atomic method of selectively converting a rendering sequence into a document is disclosed.

Figure 1A:
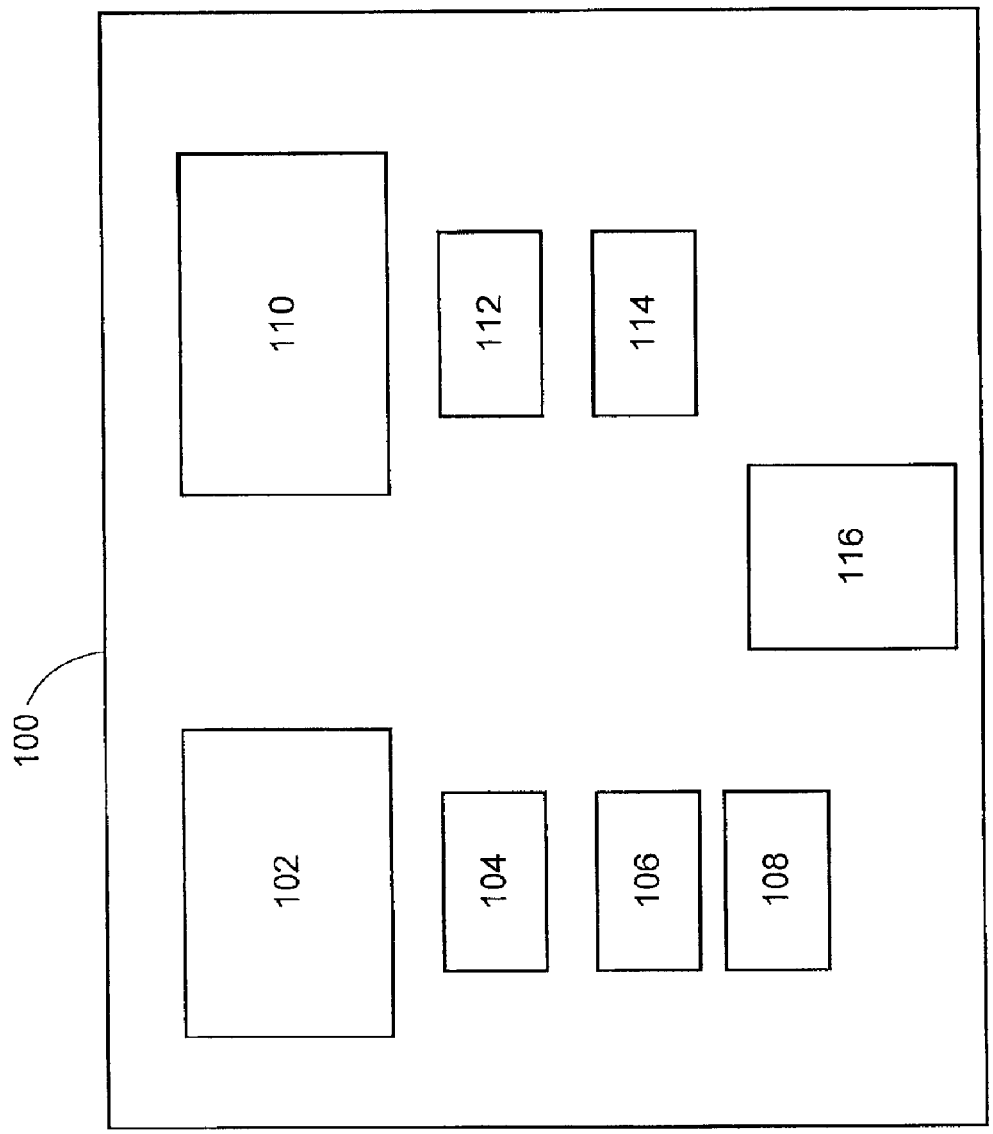
FIG. 1A illustrates a structural element representation of an exemplary document in accordance with an embodiment of the invention.

FIG. 1A illustrates a structural element based representation of an exemplary document 100. For this discussion, assume that the document 100 is a WEB page 100 provided by a WEB server. In the described embodiment, the WEB page 100 is formed of a number of ordered page elements, also referred to as structural elements. Such structural elements include a heading element 102, a first title element 104, a first text element 106, a second text element 108, and so. The WEB page 100 also includes a number of other structural elements, such as a second heading element 110, a second title element 112, a first image element 114 and a second image element 116. It should be noted that by specifying the locations of each of the elements 102–116 relative to each other, a WEB page designer can construct the WEB page 100 in whatever manner is deemed appropriate.

Figure 1B:
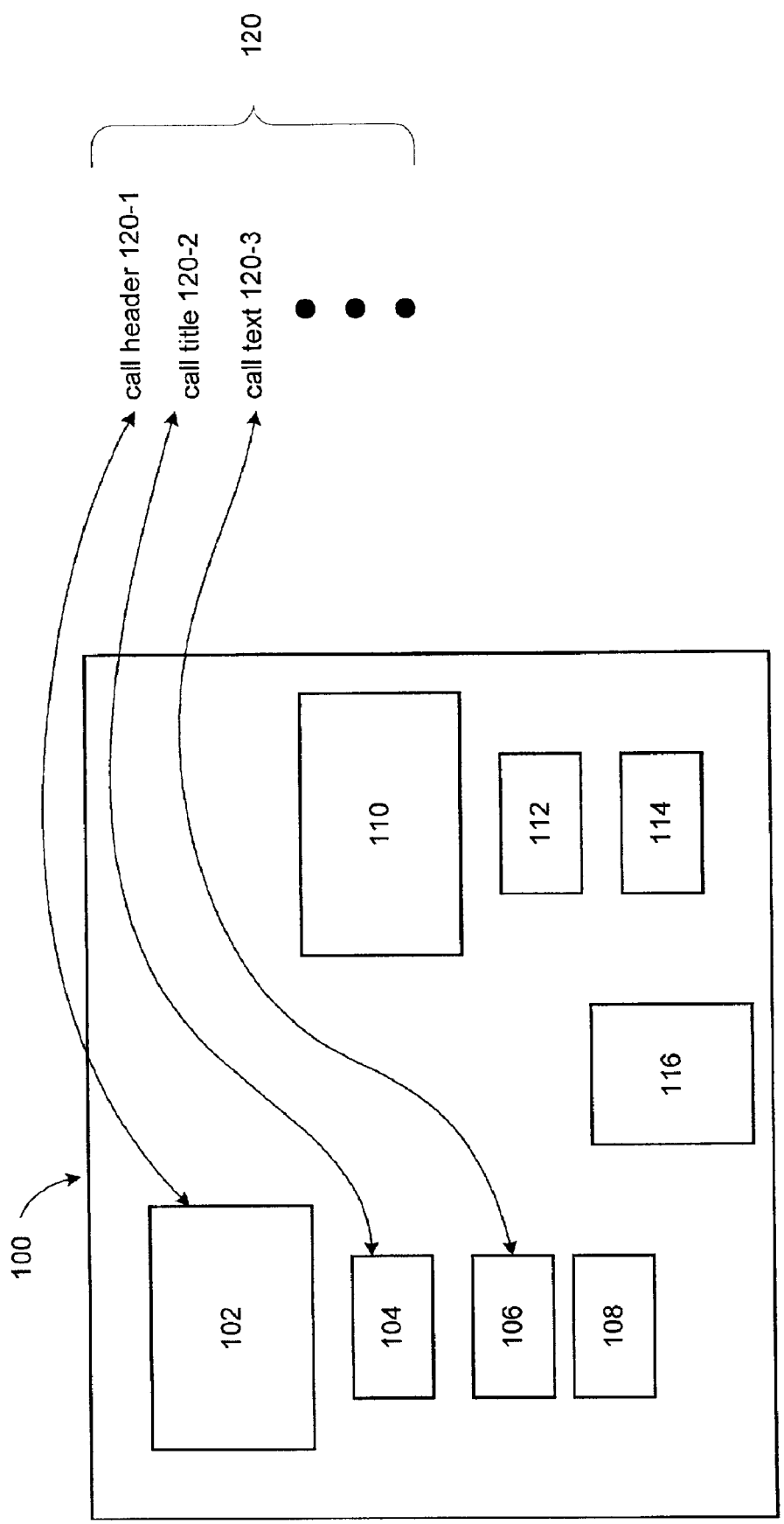
FIG. 1B shows an API based representation of the exemplary document of FIG. 1A.

In a particular implementation of the invention, the WEB page 100 can be represented as a sequence of API calls 120 each of which is associated with a particular one of the structural elements 102–116 as shown in FIG. 1B. For example, the heading element 102 is associated with a heading API call 120-1 whereas the first title element 104 is associated with a first title API call 120-2, and so on.

It is important to note that a user can designate certain of the structural elements 102–116 as being particularly relevant. For example, if the heading element 102 is considered by the user as important, or relevant, then the heading element 102 (and any other elements do characterized) can (by what is referred to as tagging) be designated as one of a group of relevant structural elements. In this way, the user can customize which portions of the rendered sequence are to undergo a particular conversion process. By tagging it is meant adding extra information on the converted output. Such added information can include an identifier for labeling or otherwise providing pertinent information about a particular converted element, adding or changing a color of a particular converted element, in addition to changing size, shape, or other such attributes.

In this way, if the user considers a particular element, such as for example, the image 116, to be particularly relevant, then the user can identify the image element 116 as one of the plurality of relevant elements. Once so designated, the user can then, after the image element 116 has been converted, access the converted image element and apply a tag to it in order to, for example, provide a label to the converted image element in the final converted document.

Figure 2:
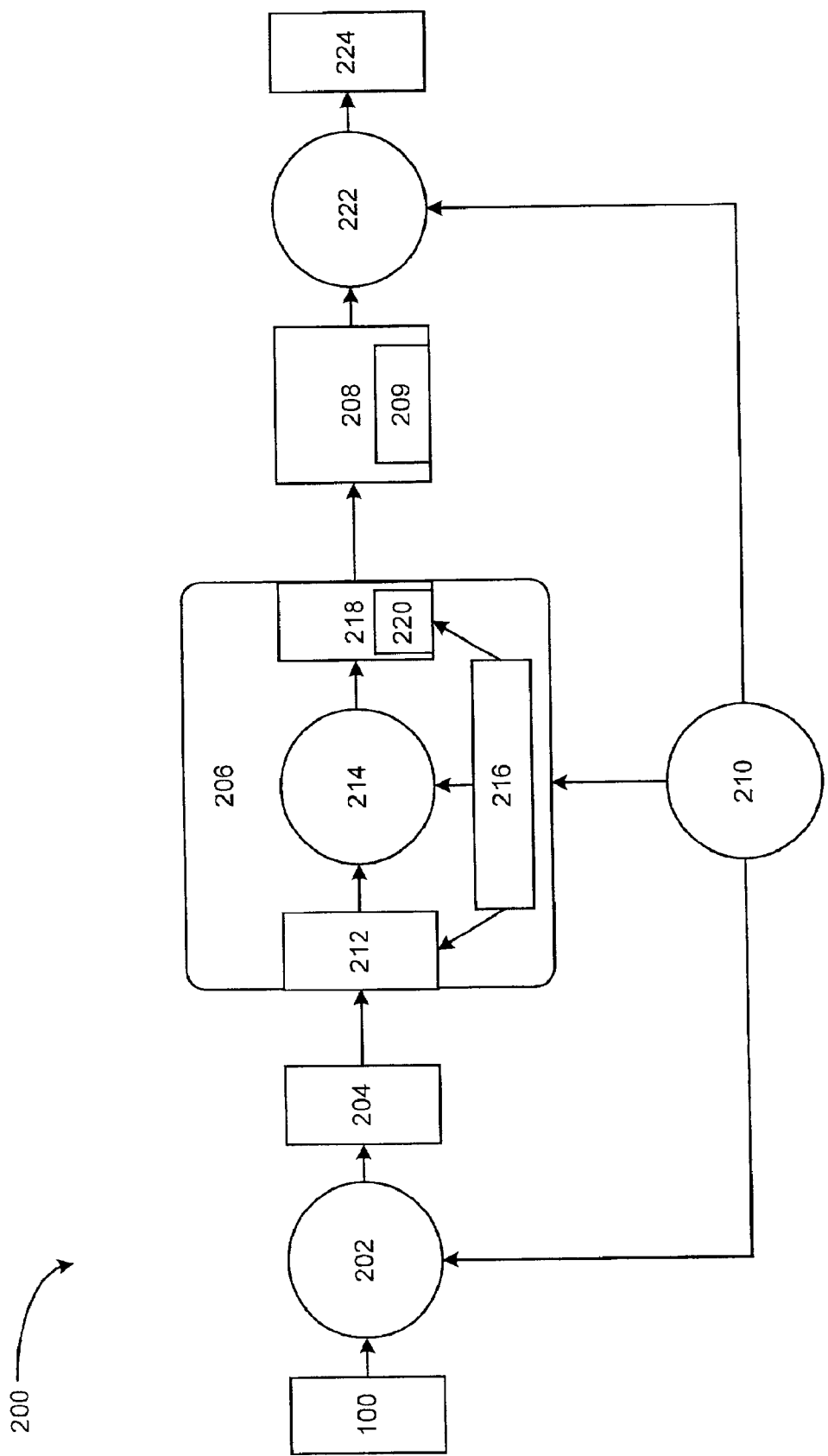
FIG. 2 illustrates a system for converting a document in accordance with an embodiment of the invention.

With reference to FIG. 2, a system 200 for providing a non-atomic user controllable document conversion process in accordance with an embodiment of the invention. The system 200 includes a renderer unit 202 arranged to render an input document into its various structural elements, or rendered components, to form a first set of rendered components 204 which, for example, can take the form of a group of API calls.

In the described embodiment, the system 200 further includes a converter unit 206 arranged to convert the first set of rendered components 204 in the first format into a second set of rendered components 208 in the second format based upon user supplied inputs provided by a user API 210. It should be noted that the second set of rendered components 208 can include a user identified sub-set of tagged rendered components 209 described below. The converter unit 206 also includes a first interface 212 arranged to receive the first set of rendered components 204 coupled to a formatter unit 214. In the described embodiment, the formatter unit 214 is configured to recursively convert the first set of rendered components 204 from the first format to the second format based upon user supplied inputs from the user API 210 provided by way of a second interface 216 that receives and processes user supplied instructions (such as, for example, formatting and/or tagging instructions). In some implementations, the user API 210 provides inputs to the renderer unit 202 that, for example, directs the renderer unit 202 to render only certain ones of the components that go to form the input document.

Once converted from the first format to the second format by the formatter unit 214, the converted rendered components are output to a third interface 218 having a tagger unit 220. In the described embodiment, the tagger unit 220 tags selected ones of the converted rendered components based upon user supplied instructions provided by the user API 210 by way of the interface 216 to form the tagged subset 209 (by tagging it is meant adding extra information on the converted output). In this way, the user can control the layout of the converted document at the structural element level as well as provide additional information to each of a number of selected (i.e., tagged) structural elements in addition to modifying selected attributes such as size, color, etc.

For example, if a user desires to tag all headers in a converted document, then the user API 210 provides instructions to the tagger unit 218 that responds by tagging those rendered components corresponding to those headers in the converted document that the user wants to be converted in a particular manner as compared to those rendered components not so tagged. In this way, the user is afforded the ability to interact with the converter unit 206 in such a way as to be able to control the relationship between the rendered components that form a document 224 as well modify any number of selected attributes heretofore impossible with conventional document converters.

Once the converter unit 206 has completed converting the first group of rendered components 204 to form the second group of converted rendered components 208 (and the subset of tagged converted rendered components 209, if any), a document combinor 222 combines the converted rendered components 208 and the tagged converted rendered components 209 (if any) to form the document 224 based, in part, upon user supplied inputs from the user API 210. In this way, the user can decide (on the fly, if necessary) the structure and other selected attributes of the document 224.

Figure 3A:
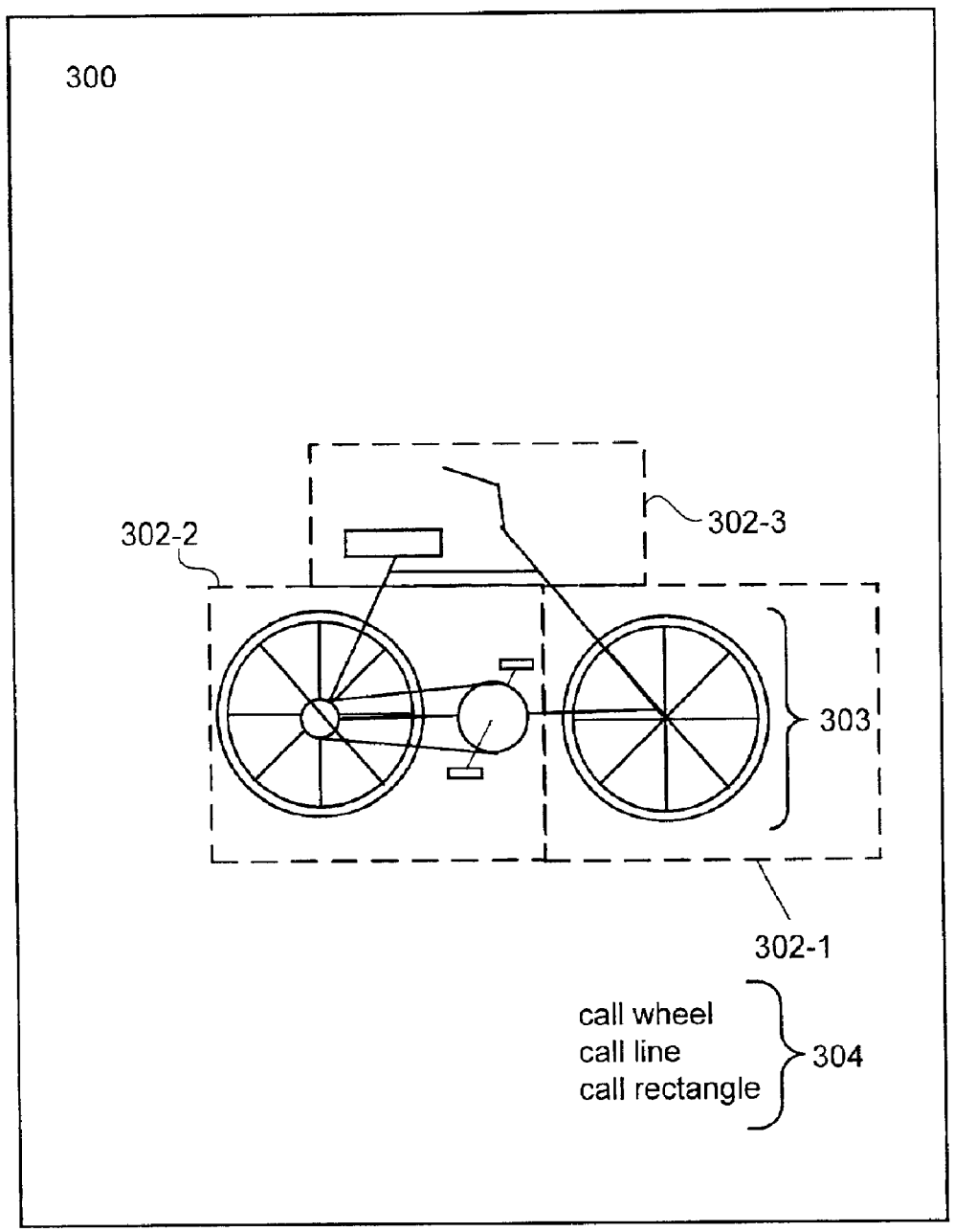
FIG. 3A illustrates a rendering sequence in accordance with an embodiment of the invention.

A particular example of the invention is now discussed with reference to FIG. 3A showing a document that takes the form of a rendering sequence 300 in accordance with an embodiment of the invention. In the described embodiment, the rendering sequence 300 can be subdivided into a number of sub-rendering sequences 302. For example, a front wheel image can be described in terms of a sub-rendering sequence 302-1, while a back wheel and pedal can be described in terms of a sub-rendering sequence 302-2 whereas a seat can be described in terms of a sequence 302-3. In the described embodiment, the rendering sequence 302-1 is formed of a number of basic rendering components such as, for example, a plurality of API calls 304. For example, in the described embodiment, the plurality of API calls 304 includes a "draw line" API, a "draw circle" API, and a "draw rectangle" API that taken together form the front wheel graphic.

Figure 3B:
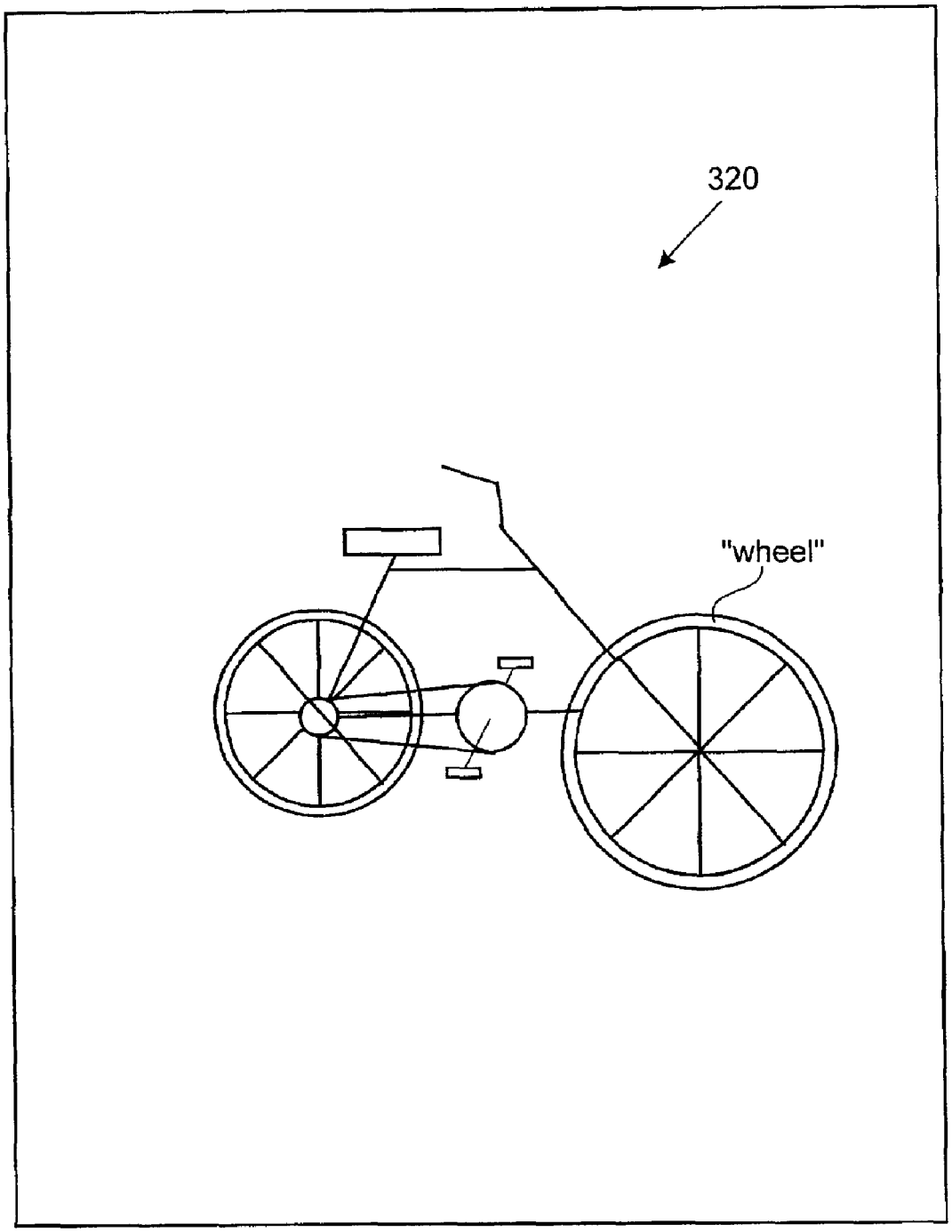
FIG. 3B illustrates a converted output of the rendering sequence of FIG. 3A.

In some cases, a user may wish to designate certain of the basic rendering components as relevant basic rendering components (i.e.; those components the user considers to be important, or relevant, to a particular use or application) that the user may want to tag, if desired. Once the user has selected those of the plurality of API calls 304 that are relevant, the user calls the converter 206 to convert each of the plurality of relevant basic rendering components which the user then accesses. If desired, the user can tag selected ones of the converted rendering components which the user can then restructure to form an output rendering sequence 320 shown in FIG. 3B illustrating how in the case where the user has tagged the converted "draw circle" API, a converted wheel image (corresponding to the converted "draw circle" API) is "zoomed" and labeled as "wheel".

Figure 4:
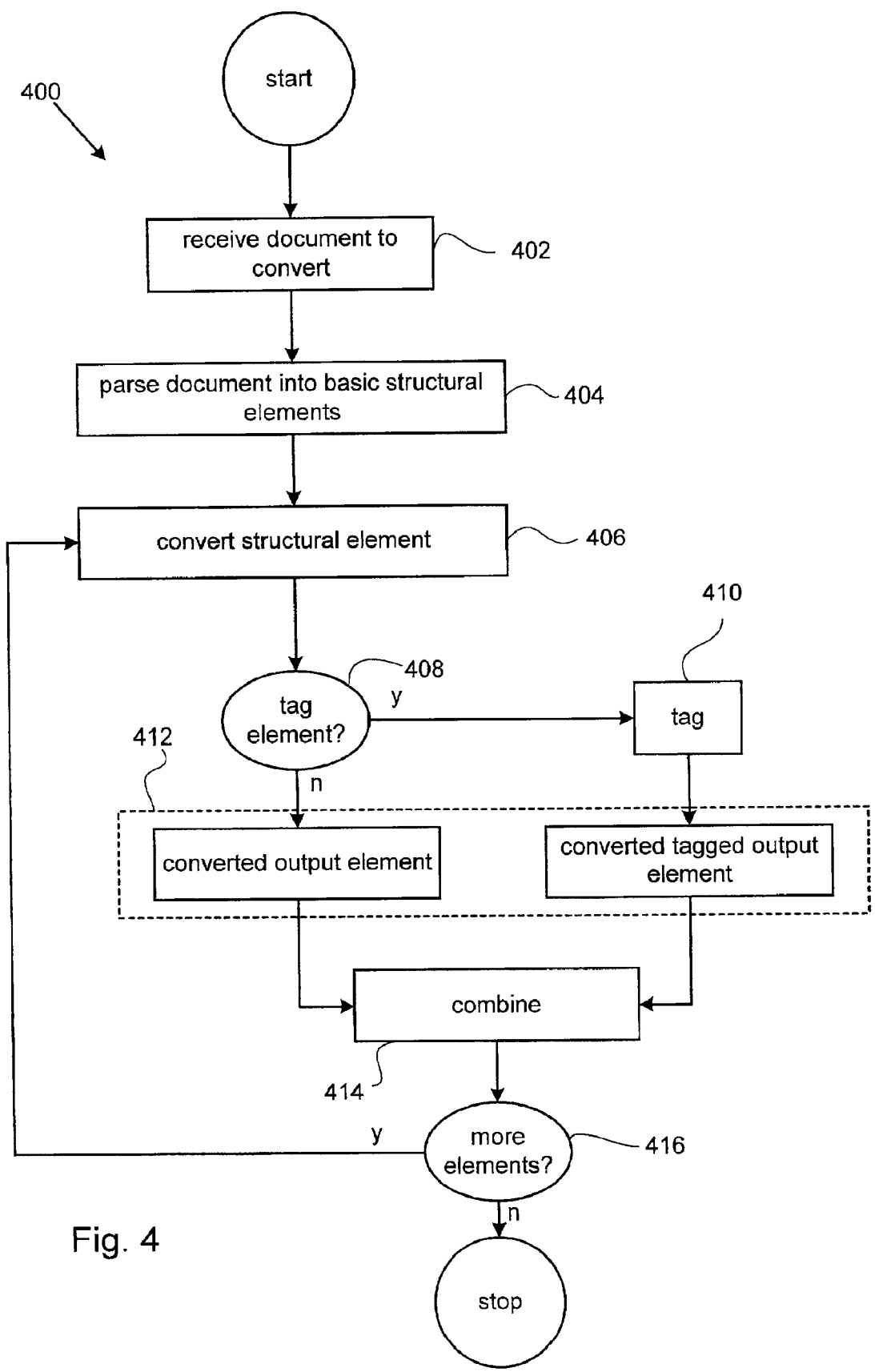
FIG. 4 illustrates a flow chart detailing a process for converting a document in accordance with an embodiment of the invention.

FIG. 4 illustrates a flow chart detailing a process 400 for converting a document in accordance with an embodiment of the invention. The process 400 begins at 402 by obtaining the document to be converted. At 404, the document to be converted is parsed into its constituent structural elements based, in part, upon user supplied inputs to form a first group of structural elements. At 406, one structural element is converted while at 408 a determination is made whether or not the converted element is to be tagged. If the converted element is to be tagged, then control is passed to 410 where the converted element is tagged. In either case, control is passed to 412 where the converted element is output to a second group of structural elements, a subset of which are tagged structural elements, if any. At 414, the converted element is combined with previously output structural elements and at 416 a determination is made whether or not there are additional elements to be converted. If there are additional elements to be converted, then control is passed back to 406, otherwise the process 400 stops.

Figure 5:
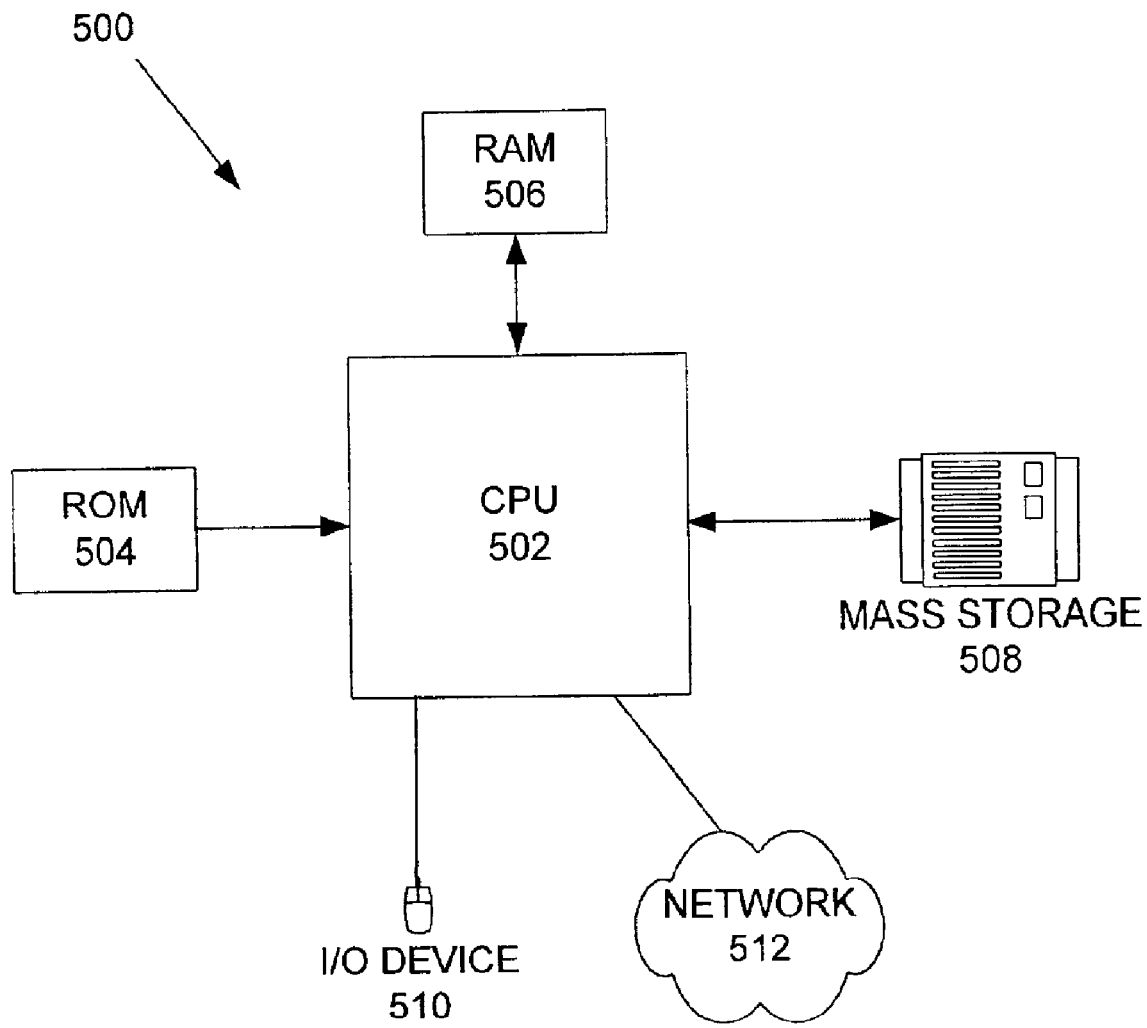
FIG. 5 illustrates a computer system that can be employed to implement the present invention.

FIG. 5 illustrates a computer system 500 that can be employed to implement the present invention. The computer system 500 or, more specifically, CPUs 502, may be arranged to support a virtual machine, as will be appreciated by those skilled in the art. As is well known in the art, ROM acts to transfer data and instructions uni-directionally to the CPUs 502, while RAM is used typically to transfer data and instructions in a bi-directional manner. CPUs 502 may generally include any number of processors. Both primary storage devices 504, 506 may include any suitable computer-readable media. A secondary storage medium 508 which is typically a mass memory device, is also coupled bi-directionally to CPUs 502 and provides additional data storage capacity. The mass memory device 508 is a computer-readable medium that may be used to store programs including computer code, data, and the like.

CPUs 502 are also coupled to one or more input/output devices 510 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 502 optionally may be coupled to a computer or telecommunications network, e.g., an Internet network, or an intranet network, using a network connection as shown generally at 512. With such a network connection, it is contemplated that the CPUs 502 might receive information from the network, or might output information to the network in the course of performing the above-described method steps. Such information, which is often represented as a sequence of instructions to be executed using CPUs 502, may be received from and outputted to the network, for example, in the form of a computer data signal embodied in a carrier wave. The above-described devices and materials will be familiar to those of skill in the computer hardware and software arts.

It should be noted that the present invention employs various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. It should be remembered however, that all of these and similar terms are to be associated with the appropriate physical quantities and are merely convenient labels applied to these quantities.

The present invention also relates to a device, system or apparatus for performing the aforementioned operations. The system may be specially constructed for the required purposes, or it may be a general-purpose computer selectively activated or configured by a computer program stored in the computer. The processes presented above are not inherently related to any particular computer or other computing apparatus. In particular, various general-purpose computers may be used with programs written in accordance with the teachings herein, or, alternatively, it may be more convenient to construct a more specialized computer system to perform the required operations.

Although only a few embodiments of the present invention have been described, it should be understood that the present invention may be embodied in many other specific forms without departing from the spirit or the scope of the present invention.

Although the methods of user controllable document conversion in accordance with the present invention are suitable for implementation with respect to a Java™ based environment; the methods may generally be applied in any suitable programming environment. For example, the methods are suitable for use in platform-independent object-based environments. It should be appreciated that the methods can also be implemented in distributed type computing systems.

It should also be appreciated that the present invention may generally be implemented on any suitable object-oriented computer system. Therefore, the present examples are to be considered as illustrative and not restrictive, and the invention is not to be limited to the details given herein, but may be modified within the scope of the appended claims along with their full scope of equivalents.

What is claimed is:

1. A user controllable non-atomic computer-implemented method of selectively converting a rendering sequence into a document, comprising:

parsing the rendering sequence into a set of associated sub-rendering sequences wherein each of the set of sub-rendering sequences includes a basic rendering component;

selecting one of the set of associated sub-rendering sequences;

selecting a basic rendering component that is relevant to the user;

breaking the selected one into a corresponding plurality of basic rendering components based upon the selected relevant rendering component;

converting each of the corresponding plurality of basic rendering components to form a set of converted rendering components;

accessing the set of converted rendering components;

tagging selected ones of the set of converted rendering components based upon a user supplied tagging instruction to form a subset of tagged converted rendering components; and combining the set of converted rendering components and the subset of tagged converted rendering components to form the document.

2. A method as recited in claim 1, wherein the parsing is based upon a user supplied parsing instruction.

3. A method as recited in claim 2, wherein rendering sequence is a plurality of API calls.

4. A method as recited in claim 3, wherein the basic rendering component is selected from a group comprising: a button, an icon, a label, a circle.

5. A user controllable apparatus for selectively converting a rendering sequence into a document, comprising:

a means for parsing the rendering sequence into a set of associated sub-rendering sequences wherein each of the set of sub-rendering sequences includes a basic rendering component;

a means for selecting one of the set of associated sub-rendering sequences;

a means for selecting a basic rendering component that is relevant to the user;

a means for breaking the selected one into a corresponding plurality of basic rendering components based upon the selected relevant rendering component;

a means for converting each of the corresponding plurality of basic rendering components to form a set of converted rendering components;

a means for accessing the set of converted rendering components;

a means for tagging selected ones of the set converted rendering components based upon a user supplied tagging instruction to form a subset of tagged converted rendering components; and a means for combining the set of converted rendering components and the subset of tagged converted rendering components to form the document.

6. An apparatus as recited in claim 5, wherein the parsing is based upon a user supplied parsing instruction.

7. An apparatus as recited in claim 6, wherein rendering sequence is a plurality of API calls.

8. An apparatus as recited in claim 7, wherein the basic rendering component is selected from a group comprising: a button, an icon, a label, a circle.

9. An apparatus as recited in claim 8, wherein the means for parsing is further based upon a user supplied rendering instruction and wherein each of the subset of tagged structural elements are rendered based upon a corresponding tagging instruction.

10. Computer program product tangibly embodied on a computer storage medium for selectively converting a first rendering sequence into a document, comprising:

computer code for parsing the rendering sequence into a set of associated sub-rendering sequences wherein each of the set of sub-rendering sequences includes a basic rendering component;

computer code for selecting one of the set of associated sub-rendering sequences;

computer code for selecting a basic rendering component that is relevant to the user;

computer code for breaking the selected one into a corresponding plurality of basic rendering components based upon the selected relevant rendering component;

computer code for converting each of the corresponding plurality of basic rendering components to form a set of converted rendering components;

computer code for accessing the set of converted rendering components;

computer code for tagging selected ones of the set of converted rendering components based upon a user supplied tagging instruction to form a subset of tagged converted rendering components;

computer code for combining the set of converted rendering components and the subset of tagged converted rendering components to form the document; and computer readable medium for storing the computer code.

* * * * *